US009613223B2

(12) United States Patent
Kao et al.

(10) Patent No.: US 9,613,223 B2
(45) Date of Patent: Apr. 4, 2017

(54) METHOD FOR APPLICATION MANAGEMENT, CORRESPONDING SYSTEM, AND USER DEVICE

(71) Applicant: Industrial Technology Research Institute, Hsinchu (TW)

(72) Inventors: Ming-Chih Kao, Taipei (TW); Yu-Hsuan Pan, Taipei (TW); Kun-Fu Huang, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 298 days.

(21) Appl. No.: 14/151,837

(22) Filed: Jan. 10, 2014

(65) Prior Publication Data

US 2015/0026827 A1 Jan. 22, 2015

(30) Foreign Application Priority Data

Jul. 17, 2013 (TW) .............................. 102125575 A

(51) Int. Cl.
*G06F 21/62* (2013.01)
*G06F 21/12* (2013.01)

(52) U.S. Cl.
CPC ........ *G06F 21/6218* (2013.01); *G06F 21/125* (2013.01)

(58) Field of Classification Search
CPC .................................................. G06F 21/6218
See application file for complete search history.

(56) References Cited

U.S. PATENT DOCUMENTS 8,055,899 B2   11/2011   Levy et al.
8,196,213 B2    6/2012   Klucher et al.
(Continued)

FOREIGN PATENT DOCUMENTS

CN    1595364    3/2005
CN    1825329    8/2006
(Continued)

OTHER PUBLICATIONS

Wu Zhou, Yajin Zhou, Xuxian Jiang, Peng Ning, Detecting Repackaged Smartphone Applications in Third-Party Android Marketplaces, Feb. 2012.*
(Continued)

*Primary Examiner* — Kambiz Zand
*Assistant Examiner* — Thanh Le
(74) *Attorney, Agent, or Firm* — Jianq Chyun IP Office

(57) ABSTRACT

A method for application management is provided. First, an original application is received. A license code is injected into the original application through a repackaging process to generate a repackaged application. Next, the repackaged application is published for a user device to download and install, wherein the user device executes a client program. When the user device executes the repackaged application, the license code sends a license check request to activate the client program to send a license check response according to license information of the repackaged application. The license check response indicates whether the repackaged application is allowed to be further executed. When the license check response indicates that the repackage application is not allowed to be further executed, the license code terminates the repackaged application.

26 Claims, 5 Drawing Sheets

(56) References Cited

U.S. PATENT DOCUMENTS

| | | | |
|---|---|---|---|
| 8,225,390 | B2 | 7/2012 | Ray et al. |
| 8,225,404 | B2 | 7/2012 | Freericks et al. |
| 8,312,445 | B2 | 11/2012 | Craft et al. |
| 8,347,386 | B2 | 1/2013 | Mahaffey et al. |
| 8,763,080 | B2 * | 6/2014 | Carrara ............... G06F 21/44 726/2 |
| 2002/0078380 | A1 * | 6/2002 | Lin ..................... G06F 21/10 726/28 |
| 2004/0093595 | A1 * | 5/2004 | Bilange ................ G06F 8/61 717/171 |
| 2007/0288886 | A1 | 12/2007 | Mensch et al. |
| 2010/0251346 | A1 * | 9/2010 | Dumais ............... G06F 21/10 726/5 |
| 2012/0117652 | A1 | 5/2012 | Manni et al. |
| 2012/0317638 | A1 | 12/2012 | Carrara et al. |
| 2012/0330786 | A1 | 12/2012 | Paleja et al. |
| 2013/0054964 | A1 | 2/2013 | Messerges et al. |

FOREIGN PATENT DOCUMENTS

| | | |
|---|---|---|
| TW | 200632690 | 9/2006 |
| TW | 200802144 | 1/2008 |
| TW | 201242391 | 10/2012 |

OTHER PUBLICATIONS

Jin-Hyuk Jung, Ju Young Kim, Hyeong-Chan Lee, Jeong Hyun Yi, Repackaging Attack on Android Banking Applications and Its Countermeasures, Jun. 2014.*

"Office Action of Taiwan Counterpart Application," issued on Apr. 9, 2015, p. 1-10.

Clemens Orthacker et al., "Android Security Permissions—Can we trust them?," Proceedings of 3rd International ICST Conference on Security and Privacy in Mobile Information and Communication Systems (MOBISEC), May 17-19, 2011, pp. 1-12.

Adrienne Porter Felt et al., "Android Permissions Demystified," Proceedings of the 18th ACM conference on Computer and communications security, CCS '11, Oct. 17-21, 2011, pp. 1-11.

Fanglu Guo et al., "A Study of the Packer Problem and Its Solutions," Proceedings of the 11th international symposium on Recent Advances in Intrusion, RAID '08, Sep. 15-17, 2008, pp. 1-18.

Michael Backes et al., "AppGuard—Real-time policy enforcement for third-party applications," Technical Report, Feb. 2012, pp. 1-16.

P. Berthomé et al., "Repackaging Android Applications for Auditing Access to Private Data," Seventh International Conference on Availability, Reliability and Security, Aug. 20-24, 2012, pp. 1-9.

Adrienne Porter Felt et al., "Permission Re-Delegation: Attacks and Defenses," 20th USENIX Conference on Security, Aug. 2011, pp. 1-16.

David Barrera et al., "A Methodology for Empirical Analysis of Permission-Based Security Models and its Application to Android," 17th ACM Conference on Computer and Communication and Security, Oct. 4-8, 2010, pp. 1-12.

David Barrera et al., "Various Approaches in Analyzing Android Applications with its Permission-Based Security Models," IEEE International Conference on Electro/Information Technology, May 2011, pp. 1-6.

Erika Chin et al., "Analyzing Inter-Application Communication in Android," Proceedings of the 9th international Conference on Mobile Systems, Applications, and Services (MobiSys), Jun. 28-Jul. 1, 2011, pp. 1-14.

"Office Action of China Counterpart Application", issued on Oct. 10, 2016, p. 1-15.

* cited by examiner

METHOD FOR APPLICATION MANAGEMENT, CORRESPONDING SYSTEM, AND USER DEVICE

CROSS-REFERENCE TO RELATED APPLICATION

This application claims the priority benefit of Taiwan application serial no. 102125575, filed on Jul. 17, 2013. The entirety of the above-mentioned patent application is hereby incorporated by reference herein and made a part of this specification.

BACKGROUND

Technical Field

The disclosure relates to a method for application management, an application management system and a user device.

Related Art

Android is a semi-open source code operating system based on Linux, which is mainly applied to mobile devices, and is continually developed by an Open Handset Alliance established by Google. An Android software development Kit (SDK) provided by Google allows a third-party software developer to develop applications for the Android operating system.

Regarding a license of the application, the Android application requires a special code to inquire the license of the application from a backend system, so as to determine whether the application is allowed to be executed. Generally, the third-party developer manually adds a license code when developing the application. The third-party software developer is required to add the license code in different ways for SDKs provided by different practitioner platforms.

Moreover, the Android SDK provides application programming interfaces (APIs) for a mobile device including network setting, hardware setting and data accessing (for example, address book accessing and international mobile equipment identity number (IMEI) accessing, etc.). Which means that the third-party application can access private data of the user stored on the mobile device and sent the same through the network. Presently, Android's control on the application is only to provide a permission list during installation of the application for the user to decide whether to install the application, so as to achieve permission control of the application. After the application is installed, the permission setting cannot be changed.

SUMMARY

Accordingly, the disclosure is directed to a method for application management, an application management system and a user device, which is capable of adding a license code and a permission code to an application, so as to facilitate the application program of the user device executing a license check procedure and implementing permission control for the application program in the user device.

The disclosure provides a method for application management, which includes following steps. First, an original application is received. A license code is injected into the original application through a repackaging process to generate a repackaged application. Next, the repackaged application is published for a user device to download and install the same, where the user device executes a client program. When the user device executes the repackaged application, the license code sends a license check request to activate the client program to send a license check response according to license information of the repackaged application. The license check response indicates whether the repackaged application is allowed to be further executed. When the license check response indicates that the repackage application is not allowed to be further executed, the license code terminates the repackaged application.

The disclosure provides a method for application management, which is adapted to a user device, and includes following steps. First, a client program is executed. A repackaged application is downloaded from an application management system, where the repackaged application is generated by the application management system by injecting a license code into an original application through a repackaging process. Then, the repackaged application is executed. When the repackaged application is executed, the license code sends a license check request to activate the client program to send a license check response according to license information of the repackaged application, where the license check response indicates whether the repackaged application is allowed to be further executed. When the license check response indicates that the repackage application is not allowed to be further executed, the license code terminates the repackaged application.

The disclosure provides an application management system including a repackaging module and an application management module. The repackaging module receives an original application, and injects a license code into the original application through a repackaging process to generate a repackaged application. The application management module publishes the repackaged application for a user device to download and install the same, where the user device executes a client program. When the user device executes the repackaged application, the license code sends a license check request to activate the client program to send a license check response according to license information of the repackaged application. The license check response indicates whether the repackaged application is allowed to be further executed. When the license check response indicates that the repackage application is not allowed to be further executed, the license code terminates the repackaged application.

The disclosure provides a user device including a communication module and a processor. The communication module is configured to connect an application management system. The processor is configured to execute a client program, and download a repackaged application from the application management system, and execute the repackaged application, where the repackaged application is generated by the application management system by injecting a license code into an original application through a repackaging process. When the repackaged application is executed, the license code sends a license check request to activate the client program to send a license check response according to license information of the repackaged application. The license check response indicates whether the repackaged application is allowed to be further executed. When the license check response indicates that the repackage application is not allowed to be further executed, the license code terminates the repackaged application.

In order to make the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated

DETAILED DESCRIPTION OF DISCLOSED EMBODIMENTS

Figure 1:
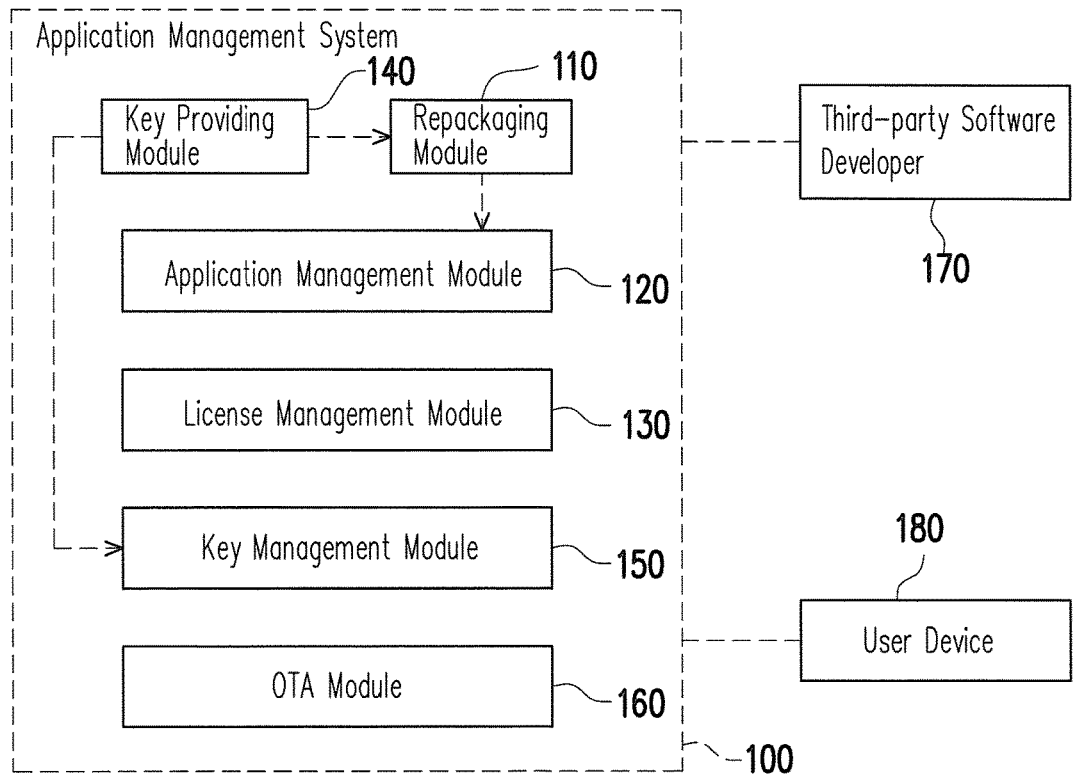
FIG. 1 is a schematic block diagram of an application management system according to an exemplary embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic block diagram of an application management system according to an exemplary embodiment of the disclosure, which is only used as an example, and is not used to limit the disclosure.

Referring to FIG. 1, the application management system 100 includes a repackaged module 110, an application management module 120, a license management module 130, a key providing module 140, a key management module 150 and an over-the-air (OTA) module 160.

In the present exemplary embodiment, the application management system 100 can be any computer-based system, which is configured to receive an application developed by a third-party software developer 170, and add a license code to the application through a repackaging process, and provide the same to a user device 180 of a client terminal for downloading. Moreover, the application management system 100 may provide the user device 180 to conduct subsequent inquiry and other related services.

The repackaging module 110 receives an application (which is defined as "an original application") developed by the third-party software developer 170, and injects a license code into the original application through a repackaging process to generate a repackaged application. Moreover, the key providing module 140 provides a key to the repackaging module 110, and the repackaging module 110 may inject the key into the original application through the repackaging process.

The application management module 120 publishes the repackaged application for the user device 180 of the client terminal to download and install the same.

The license management module 130 receives a name of the repackaged application from the user device 180, and provides license information to the user device 180 according to the name.

The key management module 150 receives a key of the repackaged application from the key providing module 140, and when the key management module 150 receives the name of the repackaged application from the user device 180, the key management module 150 provides the corresponding key to the user device 180 according to the name.

The OTA module 160 provides permission management information to the user device 180, and the user device 180 can change a permission setting according to the permission management information.

In the present exemplary embodiment, the repackaging module 110, the application management module 120, the license management module 130, the key providing module 140, the key management module 150 and the OTA module 160 can be hardware or software configured in a single server host or different server hosts.

Figure 2:
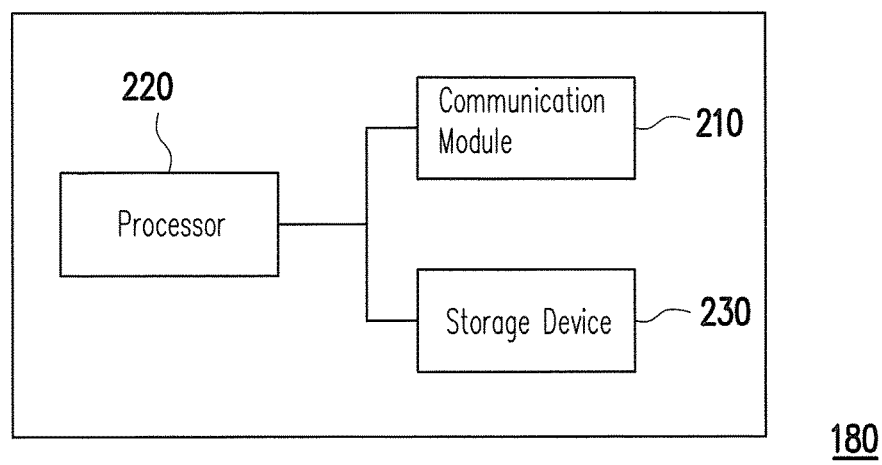
FIG. 2 is a schematic block diagram of a user device according to an exemplary embodiment.

FIG. 2 is a schematic block diagram of the user device 180 according to an exemplary embodiment of the disclosure. Referring to FIG. 2, the user device 180 includes a communication module 210, a processor 220 and a storage device 230, where the communication module 210 and the storage device 230 are respectively coupled to the processor 220.

In the present exemplary embodiment, the user device 180 is a mobile device with an Internet accessing function such as a smart phone, a tablet PC, a personal digital assistant, a notebook computer, an e-book, or a digital camera, etc. Moreover, in the present exemplary embodiment, the user device 180 applies an Android operating system. However, in other exemplary embodiment, the user device 180 may also apply a Windows operating system, an iOS operating system, an Android operating system, a Blackberry operating system, a Symbian operating system, a Linux operating system or a Unix operating system, etc.

In the following description, the processor 220 can control operations of the user device 180 related to the disclosure by executing a license code, a permission code, and a client program.

Information and data transmitted by the user device 180 are sent by the processor 220 through the communication module 210, and information and data received by the user device 180 are also received by the processor 220 through the communication module 210. Here, the communication module 210 may a support wireless signal transmission technique such as global system for mobile communications (GSM), the third generation (3G) mobile communication, 4G mobile communication, long terminal evolution (LTE) network, personal handy-phone system (PHS), code division multiple access (CDMA), wireless fidelity (Wi-Fi), worldwide interoperability for microwave access (WiMAX), Bluetooth, etc. The communication module 210 may also support a wired signal transmission technique, for example, universal serial bus (USB), Firewire serial interface or a Thunderbolt serial interface. In the present exemplary embodiment, the communication module 210 of the user device 180 is used for connecting the application management system 100.

The storage device 230 is, for example, a fixed or movable random access memory (RAM), flash memory, hard disc, memory card, other similar devices or a combination of the above devices, which is used for storing program codes and data executed by the user device 180 for hardware operation thereof.

Figure 3A:
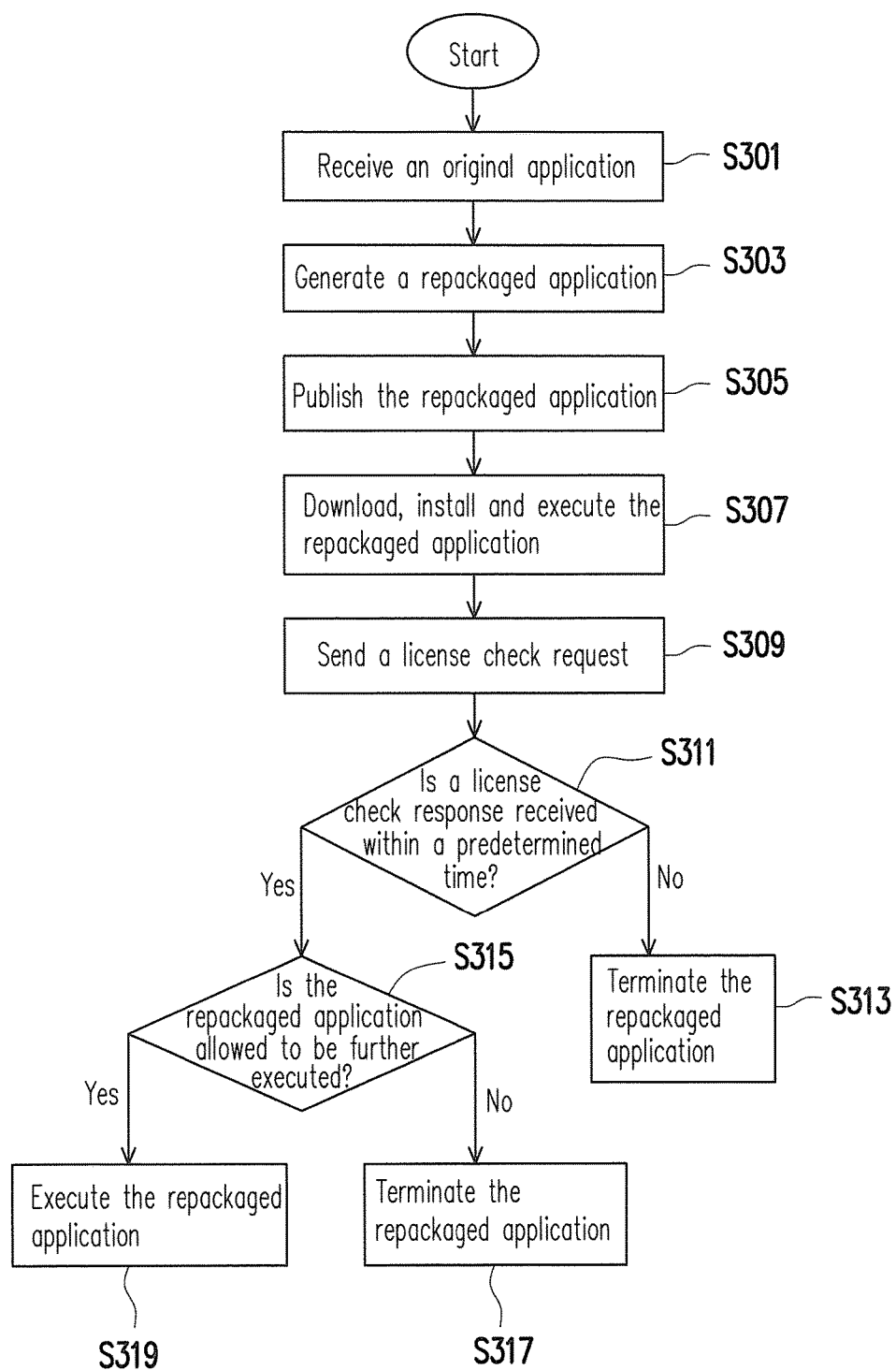
FIG. 3A is a flowchart illustrating a method for application management according to an exemplary embodiment.
Figure 3B:
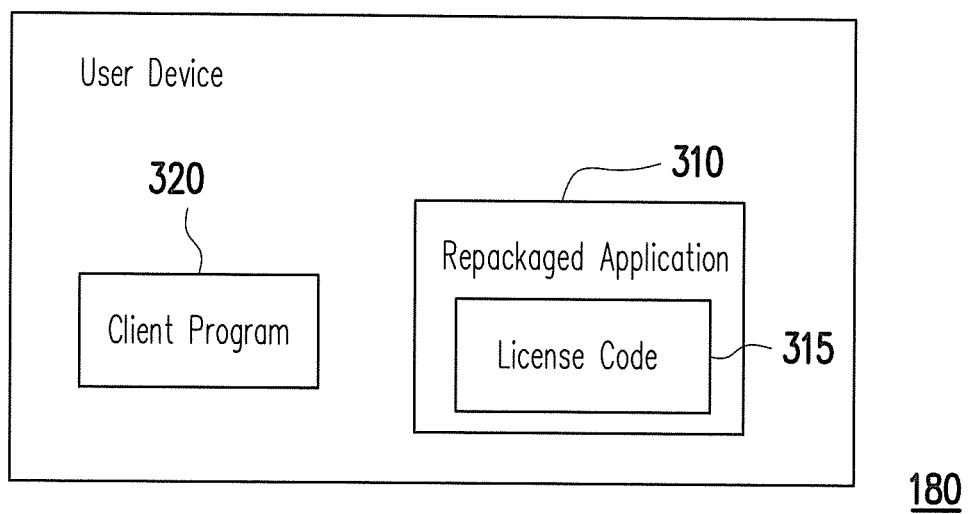
FIG. 3B is a schematic diagram of a user device according to an exemplary embodiment.

FIG. 3A is a flowchart illustrating a method for application management according to an exemplary embodiment of the disclosure. FIG. 3B is a schematic diagram of a user device 180 according to an exemplary embodiment of the disclosure. It should be noticed that in the present exemplary embodiment, descriptions are made in allusion to management of a license of an application.

Referring to FIG. 1, FIG. 2 and FIG. 3A, the repackaging module 110 of the application management system 100 first receives the original application developed by the third-party software developer 170 (step S301). In the present exemplary embodiment, after the repackaging module 110 receives the original application, the repackaging module 110 injects a license code and a key provided by the key providing module 140 into the original application through a repackaging process, so as to generate a repackaged application (step S303).

In detail, taking the Android system as an example, the repackaging module 110 first extracts a file classes.dex from the original application, and uses a disassembler to disassemble the file classes.dex into at least one file with an extension name of smali, which is defined as a "disassembled file". Then, the key providing module 140 first provides a key to the repackaging module 110, and the repackaging module 110 injects the license code and the key to the aforementioned disassembled file to generate at least one first intermediate file. The repackaging module 110 may perform static analysis on the disassembled file to inject the license code to a proper location. For example, in the present embodiment, the program code loaded by the user device 180 when the user device 180 enters the application is first analysed, and the license code is injected thereto. Moreover, the Android application is edited by the Java programming language. However, since the Java programming language is easy to be disassembled, in order to avoid attacks of reverse engineering, the repackaging module 110 dynamically obfuscates the first intermediate file to generate at least one second intermediate file. Thereafter, an assembler is used to assemble the second intermediate file, and execute a digital signature procedure required by the Android system on all of the applications, so as to generate the repackaged application. The assembler and the disassembler may adopt a smali/baksmali tool specialized for assembling and disassembling dex files.

Then, the application management module 120 publishes the repackaged application for the user device 180 to download and install the same (step S305). For example, the application management module 120 may provide a web page or an application selling platform to publish the aforementioned repackaged application, and the user device 180 may obtain the repackaged application through free download or payment.

After the user device 180 downloads and installs the repackaged application, as that shown in FIG. 3B, the user device 180 includes a repackaged application 310, and the repackaged application 310 includes a license code 315. Here, the user device 180 of FIG. 3B also includes all of the components of the user device 180 shown in FIG. 2, and details thereof may refer to related descriptions of FIG. 2, which are not repeated.

It should be noticed that the user device 180 further includes a client program 320, and when the processor 220 of the user device 180 executes the client program 320, the communication module 210 may communicate with the application management system 100 or a database of the storage device 230 to perform a license check procedure. Namely, after the user device 180 downloads and installs the repackaged application 310, when the processor 220 of the user device 180 executes the repackaged application 310 (step S307), the license code 315 included in the repackaged application 310 sends a license check request to activate the client program 320 in the user device 180 to send a license check response according to license information of the repackaged application 310 (step S309). Then, the license check response and a time required for the license check response may indicate whether the repackaged application 310 is allowed to be further executed.

In the present exemplary embodiment, the license code 315 may provide a name of the repackaged application 310 to the client program 320. Then, the client program 320 may provide the above name to the application management system 100 through the communication module 210, and the license module 130 of the application management system 100 provides the corresponding license information to the client program 320 according to the received name of the repackaged application 310. The client program 320 conducts the license check according to the content of the license information. For example, the license information may include license agreements of expiration date and number of times of use, etc. of the repackaged application 170. The client program 320 conducts the license check according to the license information, and the license check response indicates whether the repackage application 310 is allowed to be further executed. Then, the client program 320 transmits the license check response to the license code 315 to notify the license code 315 to continue or terminate the repackaged application 310. However, considering a safety protection design and in order to avoid attack of inter-applications, the present exemplary embodiment adopts a safe communication protocol of inter-process communication (IPC) to ensure integrity of data transmitted between the client program and the repackaged application.

In detail, taking the Android operating system as an example, the Android operating system provides an IPC channel between the repackaged application 310 and the client program 320. Moreover, the license code 315 may further include a timer. When the license code 315 of the repackaged application 310 sends the license check request, the license code 315 first encrypts the license check request by using the key of the repackaged application 310, and then sends the name of the repackaged application 310 and the encrypted license check request to the client program 320. Now, the timer starts timing.

After the client program 320 receives the name of the repackaged application 310 and the encrypted license check request, the client program 320 provides the name to the application management system 100 through the communication module 210. The application management system 100 controls the key management module 150 to inquire the key providing module 140 for the corresponding key of the repackaged application 310 according to the name, and transmits back the key to the user device 180.

In another exemplary embodiment, if the user device 180 has executed the license check procedure before, the user device 180 can store both the license information and the key in the database of the storage device 230, or only store one of the license information and the key in the database of the storage device 230. In this way, the client program can directly use the name of the repackaged application 310 to inquire the key and the license information corresponding to the repackaged application from the database without inquiring the application management system 100.

After the user device 180 obtains the aforementioned license information and the key from the communication module 230 or its own storage device 230, the client program 320 first decrypts the license check request by using the aforementioned key, and generates the license check response according to the license information, and then encrypts the license check response by using the aforementioned key, and transmits the same to the license code 315 of the repackaged application 310. Then, the license code 315 decrypts the license check response and inspects the content thereof, and the timer stops timing.

In the present exemplary embodiment, whether the repackaged application is allowed to be further executed is determined according to the license check response of the client program 320 and a timing result of the timer. First, according to the timing result of the timer, the license code 315 determines whether the license check response is received within a predetermined time (for example, 5 seconds) after sending the license check request to the client program 320 (step S311). If the license check response is not received within the predetermined time, the license code 315 terminates the repackaged application (step S313). Conversely, if the license check response is received within the predetermined time, the license code 315 determines whether to continually execute the repackaged application 310 according to the license check response (step S315). When the license check response indicates that the repackage application 310 is not allowed to be further executed, the license code 315 terminates the repackaged application 310 (step S317). Conversely, the license code 315 continually executes the repackaged application 310 (step S319).

In the present exemplary embodiment, the user device 180 may obtain the license information from the application management system 100, and the client program 320 determines whether to stop using the repackaged application 310 according to the license information. Moreover, when the user device 180 allows independent threads of the applications based on a sand box to ensure security of the system, for example, Android, iOS, blackberry, Symbian, etc., the disclosure further provides a permission management of the applications, so as to set different access permissions for one or a plurality of applications in the user device 180.

Figure 4A:
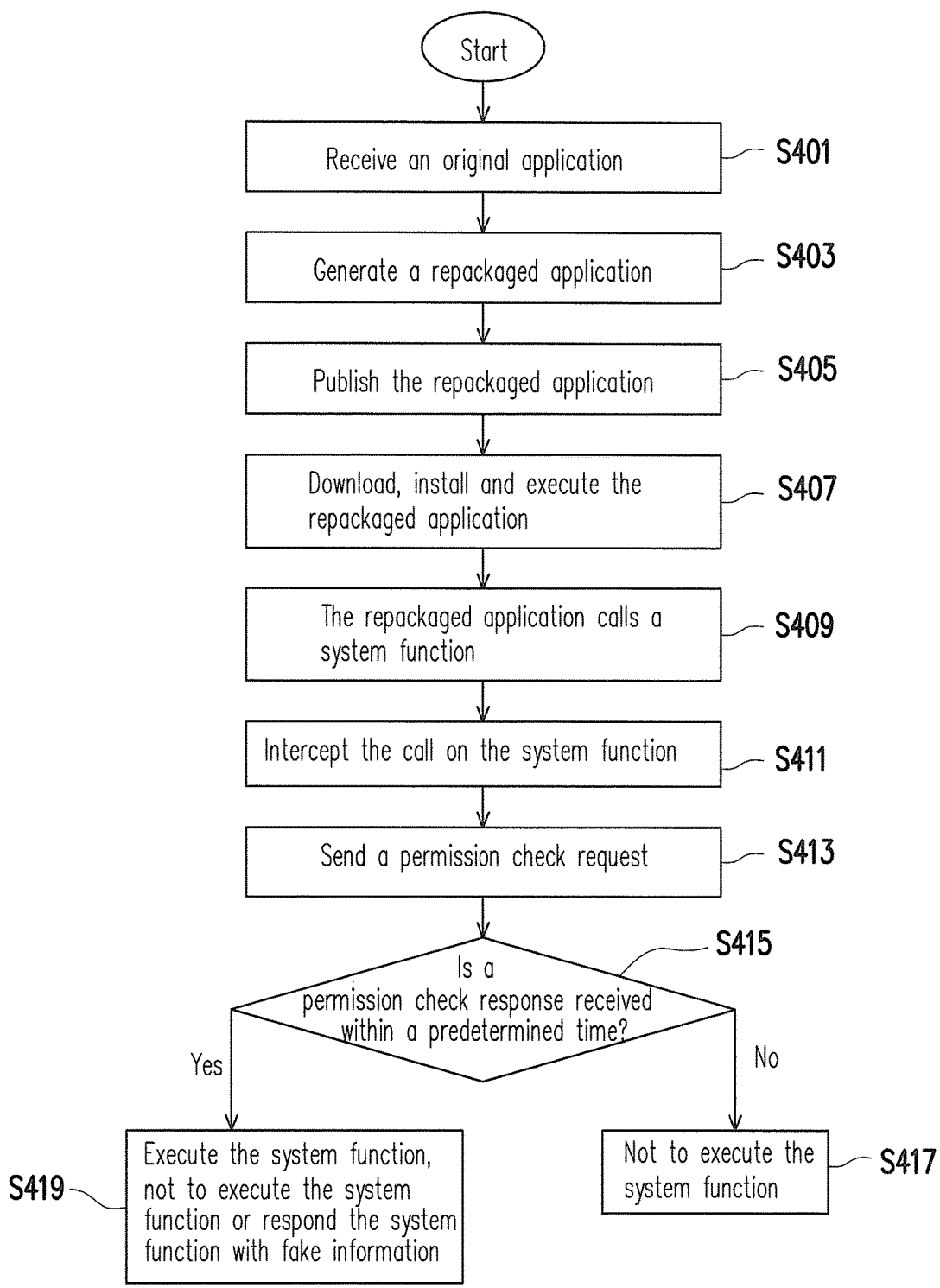
FIG. 4A is a flowchart illustrating a method for application management according to an exemplary embodiment.
Figure 4B:
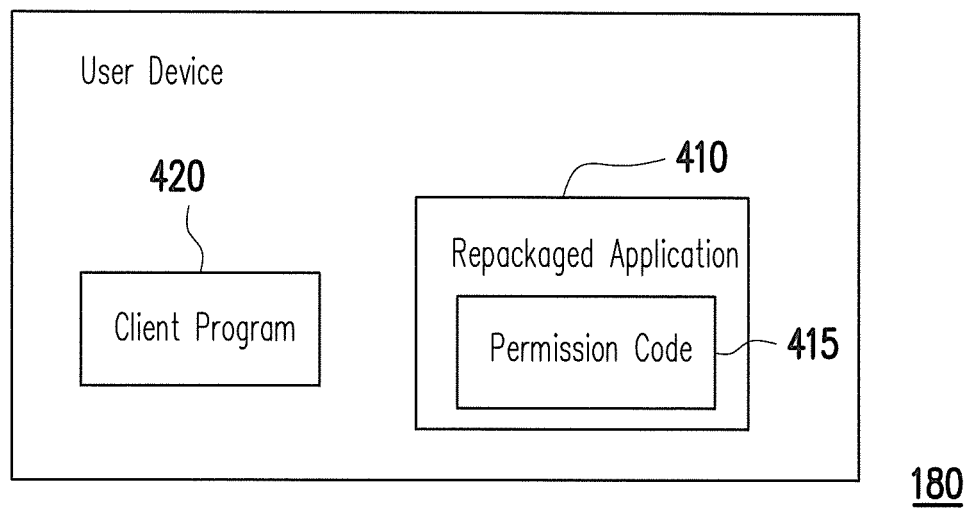
FIG. 4B is a schematic diagram of a user device according to an exemplary embodiment.

FIG. 4A is a flowchart illustrating a method for application management according to an exemplary embodiment of the disclosure. FIG. 4B is a schematic diagram of a user device 180 according to an exemplary embodiment of the disclosure. Different to the aforementioned exemplary embodiment, descriptions are made in allusion to management of permissions of the applications in the present exemplary embodiment.

Referring to FIG. 4A in collaboration with FIG. 1 and FIG. 2, first, the repackaging module 110 of the application management system 100 receives an original application developed by the third-party software developer 170 (step S401). In the present exemplary embodiment, after the repackaging module 110 receives the original application, the repackaging module 110 injects a permission code and a key provided by the key providing module 140 into the original application through a repackaging process, so as to generate a repackaged application (step S403).

In the present exemplary embodiment of the disclosure, the repackaging module 110 first extracts a file classes.dex from the original application, and uses a disassembler to disassemble the file classes.dex into at least one disassembled file with an extension name of smali. Then, the key providing module 140 first provides a key to the repackaging module 110, and the repackaging module 110 injects the permission code and the key to the aforementioned disassembled file to generate at least one first intermediate file. The repackaging module 110 may also perform static analysis on the disassembled file to inject the permission code to a proper location. For example, in the present embodiment, a program code of an application programming interface (API) related to user's privacy can be analyzed, and the permission code is injected thereto. Moreover, the repackaging module 110 dynamically obfuscates the first intermediate file to generate at least one second intermediate file. Thereafter, an assembler of smali is used to assemble the second intermediate file, and execute a digital signature procedure required by the Android system on all of the applications, so as to generate the repackaged application. Similar to the first exemplary embodiment, the assembler and the disassembler may adopt a smali/baksmali tool specialized for assembling and disassembling dex files.

Then, the application management module 120 publishes the repackaged application for the user device 180 to download and install the same (step S305). For example, the application management module 120 may provide a web page or an application selling platform to publish the aforementioned repackaged application, and the user device 180 may obtain the repackaged application through free download or payment.

After the user device 180 downloads and installs the repackaged application, as that shown in FIG. 4B, the user device 180 includes a repackaged application 410, and the repackaged application 410 includes a permission code 415. Here, the user device 180 of FIG. 4B also includes all of the components of the user device 180 shown in FIG. 2, and details thereof may refer to related descriptions of FIG. 2, which are not repeated.

It should be noticed that the user device 180 further includes a client program 420, and when the processor 220 of the user device 180 executes the client program 420, the communication module 210 may communicate with the application management system 100 or a database of the storage device 230 to perform a license check procedure.

Moreover, the storage device 230 stores permission settings of some system functions, and the system functions generally refer to information privacy or information security of the user, for example, a function used for obtaining an international mobile equipment identity number (IMEI) of the user device 180, a function used for accessing a subscriber identity module (SIM) of the user device 180, a function used for obtaining an international mobile subscriber identity number (IMSI) of the user device 180, a function used for searching location information of the user device 180, a function used for obtaining a phone number, a function of sending a text, and a function used for downloading files through network, etc. In the present exemplary embodiment, the client program may provide a user interface, and the user of the user device 180 may use the user interface to change the permission setting of the aforementioned system function as executive, non-executive or respond with fake information. Based on the aforementioned user interface, the permission setting can be changed at any time, and the permission code 415 may execute the aforementioned system function, not to execute the system function, or respond the system function with the fake information according to the permission setting of the system function.

After the user device 180 downloads and installs the repackaged application, when the processor 220 of the user device 180 executes the repackaged application (step S407), and when the repackaged application calls the aforementioned system function (step S409), the permission code in the repackaged application first intercepts the call of the repackaged application on the aforementioned system function (step S411), and sends a permission check request to activate the client program to send a permission check response according to the permission setting of the aforementioned system function (step S413). Moreover, the permission check response and a time required for the permission check response may indicate whether the aforementioned system function is allowed to be further executed.

In detail, in the previous exemplary embodiment, the Android operating system provides an IPC channel between the repackaged application and the client program. Moreover, the permission code 415 further includes a timer. When the permission code 415 of the repackaged application 410 sends the permission check request, the permission code 415 first encrypts the permission check request by using the key of the repackaged application 410, and then sends the name of the repackaged application 410 and the encrypted permission check request to the client program 420. Now, the timer starts timing.

After the client program 420 receives the name of the repackaged application 410 and the encrypted permission check request, the client program 420 provides the name to the application management system 100 through the communication module 210. The application management system 100 controls the key management module 150 to inquire the key providing module 140 for the corresponding key of the repackaged application 310 according to the name, and transmits back the key to the user device 180.

In another exemplary embodiment, if the user device 180 has executed the permission check procedure before, the key can be in the database of the storage device 230. In this way, the client program can directly use the aforementioned name to inquire the key corresponding to the repackaged application from the database.

After the user device 180 obtains the key from the communication module 230 or its own storage device 230, the client program 420 first decrypts the permission check request by using the aforementioned key, and encrypts the permission check response by using the aforementioned key, and transmits the same to the permission code 415 of the repackaged application 410. The permission code 415 decrypts the permission check response and inspects the content thereof; and the timer stops timing. Here, the permission check response is the permission setting of the system function set by the user of the user device 180 through the user interface.

In the present exemplary embodiment, first, according to the timing result of the timer, the permission code 415 determines whether the permission check response is received within a predetermined time (for example, 5 seconds) after sending the permission check request to the client program 420 (step S415). If the permission check response is not received within the predetermined time, the permission code 415 does not execute the aforementioned system function (step S417). Conversely, if the permission check response is received within the predetermined time, the permission code 415 determines to continually execute the aforementioned system function, not to execute the system function or respond the system function with fake information according to the permission check response (step S419).

For example, it is assumed that the user device 180 stores a repackaged application of navigation and a repackaged application of the Facebook. The user device 180 may set different permission settings to the system function in allusion to the two packaged applications. Taking the system function of reading location information as an example, the repackaged application of navigation is set to be capable of reading global positioning system (GPS) data of the user device 180, and the repackaged application of the Facebook is set to be not capable of reading the GPS data of the user device 180. Therefore, once the repackaged application of the Facebook executes the system function of reading the location information, the permission code may refuse the Facebook to read the GPS data according to the permission check response. In another embodiment, the license code can also respond fake information to the system function of reading the location information, such that the Facebook reads the fake GPS data. In this way, the user of the user device 180 can avoid the GPS data of the user's location being read and tracked by others on the Facebook, and meanwhile the user can use the GPS data enjoy a navigation service.

In another exemplary embodiment, the client program 420 further has a real-time analysing function. When the user device 180 executes the repackaged application 410 and the repackaged application 410 loads a new program code dynamically during the execution of the repackaged application 410, the permission code 415 of the repackaged application 410 transmits the new program code to the client program 420 for analysis. Here, the new program code can be an update file of the repackaged application form the application management system 100 or other sources.

When the repackaged application 410 loads the new program code during the execution of the repackaged application 410, the permission code 415 intercepts the new program code, and transmits the new program code to the client program 420. The client program 420 analyzes whether the new program code calls the system function requiring the permission management, and modifies the new program code according to the analysis result. After the client program 420 modifies the new program code, the client program 420 transmits the modified new program code to the permission code 415. Then, the permission code 415 allows adding the modified new program code to the repackaged application 410. The aforementioned modification enables the permission code 415 to intercept the call of the new program code on the aforementioned system function and send the permission check request to activate the client program 420 to send the permission check response according to the permission setting.

In the present exemplary embodiment, under a specific circumstance, the OTA module 160 of the application management system 100 may transmit license management information to the client program 420 of the user device 180. For example, when the user loses the user device 180, the user can notify the application management system 100, and the OTA module 160 of the application management system 100 can transmit the license management information to the client program 420 of the user device 180 to notify the client program 420 to change the permission setting of the system function. For example, the license management information may notify the client program 420 to set the repackaged application of navigation to be capable of reading the GPS data to facilitate tracking a location of the user device 180. For another example, the license management information may notify the client program 420 to prohibit all of the repackaged applications 410 from obtaining phone numbers, sending short messages and receiving short messages, so as to prevent the phone numbers or private data from being stolen.

Besides, according to the method for application management of the present exemplary embodiment, it is unnecessary to modify the underlying operating system of the user device 180, so that the application management system 100 is not limited to the telecommunication practitioner. In another exemplary embodiment, the application management system 100 can be a general software system integrator, which is capable of using the application management method of the disclosure to develop an independent platform, and an operation method thereof is similar to a software selling platform, and the independent platform can be applied in internal of an enterprise or organization to provide applications complied with an accessing policy of the enterprise or organization to internal staff or related personnel. In such exemplary embodiment, the user device 180 may upload the existing original application to the application management system 100. The application management system 100 can perform the repackaging process on the original application to generate a repackaged application capable of dynamically setting the permission, and provide the same to the user device 180 for downloading.

It should be noticed that the repackaging processes of the license management embodiment of FIG. 3A and the license management embodiment of FIG. 4A can be integrated, i.e. the license code, the permission code and the key are all together injected to the original application. In this way, the repackaged application downloaded by the user device 180 may execute the license check procedure and the permission check procedure. The license check procedure and the permission check procedure may use a same key or different key, and if different keys are used, the key providing module 140 has to provide two different keys, and the two different keys have to be injected to the original application through the repackaging process to generate the repackaged application, where one key is used for encryption and decryption of the license check procedure, and another key is used for encryption and decryption of the permission check procedure.

In summary, according to the method for application management and the application management system provide by the disclosure, before the original application developed by the third-party software developer is published, the repackaging process can be performed to inject the license code and the permission code to the original application to generate the repackaged application. After the user device downloads and installs the repackaged application, the client program of the user device can execute the license check procedure. Moreover, the client program can provide the user interface, such that the user of the user device may set the accessing permissions of the related system functions of the repackaged applications through the user interface, so as to implement different permission controls on the repackaged applications to properly protect the user privacy.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for application management, comprising:
receiving an original application by an application management system;
injecting a license code and a permission code into the original application through a repackaging process by the application management system to generate a repackaged application; and
publishing the repackaged application by the application management system for a user device to download and install the repackaged application, wherein the user device stores a permission setting of a system function,
wherein the user device executes a client program, when the user device executes the repackaged application, the license code of the repackaged application sends a license check request to activate the client program to send a license check response according to license information of the repackaged application, the license check response indicates whether the repackaged application is allowed to be further executed, and when the license check response indicates that the repackaged application is not allowed to be further executed, the license code terminates the repackaged application, and
wherein the permission code intercepts a call of the repackaged application on the system function, and sends a permission check request to activate the client program to send a permission check response according to the permission setting, and the permission code executes the system function, not to execute the system function, or respond the system function with fake information according to the permission check response, wherein when the repackaged application loads a new program code during execution of the repackaged application, the permission code transmits the new program code to the client program, the client program modifies the new program code to enable the permission code to intercept a call of the new program code on the system function and send the permission check request to activate the client program to send the permission check response according to the permission setting, and then the permission code allows adding the new program code to the repackaged application.

2. The method for application management as claimed in claim 1, wherein the license code provides a name of the repackaged application to the client program, and the method for application management further comprises:
receiving the name from the client program by the application management system; and
providing the license information to the client program by the application management system according to the name.

3. The method for application management as claimed in claim 1, further comprising:
providing permission management information to the client program by the application management system, wherein the client program changes the permission setting according to the permission management information.

4. The method for application management as claimed in claim 1, wherein when the license code does not receive the license check response within a predetermined time after sending the license check request, the license code terminates the repackaged application, and when the permission code does not receive the permission check response within the predetermined time after sending the permission check request, the permission code does not execute the system function.

5. The method for application management as claimed in claim 1, wherein the license code or the permission code provides a name of the repackaged application to the client program, and the method for application management further comprises:
injecting at least one key into the original application through the repackaging process by the application management system to generate the repackaged application;
receiving the name by the application management system from the client program; and
providing one of the at least one key to the client program by the application management system according to the name,
wherein when the name is provided by the license code, the license code uses the key to encrypt the license check request and decrypt the license check response, and the client program uses the key to decrypt the license check request and encrypt the license check response, when the name is provided by the permission code, the permission code uses the key to encrypt the permission check request and decrypt the permission check response, and the client program uses the key to decrypt the permission check request and encrypt the permission check response.

6. The method for application management as claimed in claim 5, wherein the step of generating the repackaged application by the application management system through the repackaging process comprises:

disassembling the original application by the application management system to generate at least one disassembled file;

injecting the license code, the permission code and the at least one key into the at least one disassembled file by the application management system to generate at least one first intermediate file;

dynamically obfuscating the at least one first intermediate file by the application management system to generate at least one second intermediate file; and assembling the at least one second intermediate file and executing a digital signature procedure by the application management system to generate the repackaged application.

7. A method for application management, adapted to a user device, and comprising:

executing a client program;

downloading a repackaged application from an application management system, wherein the repackaged application is generated by the application management system by injecting a license code and a permission code into an original application through a repackaging process;

storing a permission setting of a system function;

executing the repackaged application, wherein when the repackaged application is executed, the license code of the repackaged application sends a license check request to activate the client program to send a license check response according to license information of the repackaged application, wherein the license check response indicates whether the repackaged application is allowed to be further executed, wherein when the license check response indicates that the repackaged application is not allowed to be further executed, the license code terminates the repackaged application;

intercepting a call of the repackaged application on the system function by the permission code, and sending a permission check request to activate the client program to send a permission check response according to the permission setting;

executing the system function, not to execute the system function, or responding the system function with fake information by the permission code according to the permission check response;

when a new program code is loaded by the repackaged application during execution of the repackaged application, transmitting the new program code to the client program by the permission code;

modifying the new program code by the client program to enable the permission code to intercept a call of the new program code on the system function and send the permission check request to activate the client program to send the permission check response according to permission setting; and allowing to add the new program code to the repackaged application by the permission code after the client program modifies the new program code.

8. The method for application management as claimed in claim 7, further comprising:

providing a name of the repackaged application to the client program by the license code;

providing the name to the application management system by the client program, wherein the application management system provides the license information according to the name; and receiving the license information from the application management system by the client program.

9. The method for application management as claimed in claim 7, further comprising:

providing a user interface by the client program to facilitate a user of the user device changing the permission setting.

10. The method for application management as claimed in claim 7, further comprising:

receiving permission management information from the application management system by the client program; and changing the permission setting by the client program according to the permission management information.

11. The method for application management as claimed in claim 7, further comprising:

when the license code does not receive the license check response within a predetermined time after sending the license check request, terminating the repackaged application by the license code; and when the permission code does not receive the permission check response within the predetermined time after sending the permission check request, not to execute the system function by the permission code.

12. The method for application management as claimed in claim 7, wherein the application management system further injects at least one key into the original application through the repackaging process to generate the repackaged application, and the method for application management further comprises:

providing a name of the repackaged application to the client program by the license code or the permission code;

providing the name to the application management system by the client program, wherein the application management system provides one of the at least one key according to the name; and receiving the key from the application management system by the client program, wherein when the name is provided by the license code, the license code uses the key to encrypt the license check request and decrypt the license check response, and the client program uses the key to decrypt the license check request and encrypt the license check response, and when the name is provided by the permission code, the permission code uses the key to encrypt the permission check request and decrypt the permission check response, and the client program uses the key to decrypt the permission check request and encrypt the permission check response.

13. The method for application management as claimed in claim 12, further comprising:

storing the license information and/or the key received from the application management system into the user device by the client program, wherein when the user device already stores the license information, the client program sends the license check response according to the license information stored in the user device, and when the user device already stores the key, the client program uses the key stored in the user device to decrypt the license check request and/or the permission check request, and the client program uses the key stored in the user device to encrypt the license check response and/or the permission check response.

14. An application management system, comprising:
a processor, configured to receive an original application, inject a license code and a permission code into the original application through a repackaging process to generate a repackaged application, and
publish the repackaged application for a user device storing a permission setting of a system function to download and install the repackaged application,
wherein the user device executes a client program, when the user device executes the repackaged application, the license code sends a license check request to activate the client program to send a license check response according to license information of the repackaged application, the license check response indicates whether the repackaged application is allowed to be further executed, and when the license check response indicates that the repackaged application is not allowed to be further executed, the license code terminates the repackaged application, and
wherein the permission code intercepts a call of the repackaged application on the system function, and sends a permission check request to activate the client program to send a permission check response according to the permission setting, and the permission code executes the system function, not to execute the system function, or respond the system function with fake information according to the permission check response, wherein when the repackaged application loads a new program code during execution of the repackaged application, the permission code transmits the new program code to the client program, the client program modifies the new program code to enable the permission code to intercept a call of the new program code on the system function and send the permission check request to activate the client program to send the permission check response according to the permission setting, and then the permission code allows adding the new program code to the repackaged application.

15. The application management system as claimed in claim 14, wherein the license code provides a name of the repackaged application to the client program, and the processor is further configured to receive the name from the client program and provide the license information to the client program according to the name.

16. The application management system as claimed in claim 14, wherein the processor is further configure to provide permission management information to the client program, wherein the client program changes the permission setting according to the permission management information.

17. The application management system as claimed in claim 14, wherein when the license code does not receive the license check response within a predetermined time after sending the license check request, the license code terminates the repackaged application, and when the permission code does not receive the permission check response within the predetermined time after sending the permission check request, the permission code does not execute the system function.

18. The application management system as claimed in claim 14, wherein the license code or the permission code provides a name of the repackaged application to the client program, and the processor is further configured to:
provide at least one key, wherein the repackaging module further injects the at least one key into the original application through the repackaging process to generate the repackaged application;
obtain the at least one key from the key providing module, receiving the name from the client program; and
provide one of the at least one key to the client program according to the name, wherein when the name is provided by the license code, the license code uses the key to encrypt the license check request and decrypt the license check response, and the client program uses the key to decrypt the license check request and encrypt the license check response, and when the name is provided by the permission code, the permission code uses the key to encrypt the permission check request and decrypt the permission check response, and the client program uses the key to decrypt the permission check request and encrypt the permission check response.

19. The application management system as claimed in claim 18, wherein the processor is configured to disassemble the original application to generate at least one disassembled file, inject the license code, the permission code and the at least one key into the at least one disassembled file to generate at least one first intermediate file, dynamically obfuscate the at least one first intermediate file to generate at least one second intermediate file, and assemble the at least one second intermediate file and executes a digital signature procedure to generate the repackaged application.

20. A user device, comprising:
a communication module, configured to connect an application management system;
a storage device, storing a permission setting of a system function; and
a processor, configured to execute a client program and download a repackaged application from the application management system and execute the repackaged application, wherein the repackaged application is generated by the application management system by injecting a license code and a permission code into an original application through a repackaging process,
wherein when the repackaged application is executed, the license code of the repackaged application sends a license check request to activate the client program to send a license check response according to license information of the repackaged application, wherein the license check response indicates whether the repackaged application is allowed to be further executed, and when the license check response indicates that the repackaged application is not allowed to be further executed, the license code terminates the repackaged application; and
wherein the permission code intercepts a call of the repackaged application on the system function, and sends a permission check request to activate the client program to send a permission check response according to the permission setting, and the permission code executes the system function, not to execute the system function, or responds the system function with fake information according to the permission check response, wherein when the repackaged application loads a new program code during execution of the repackaged application, the permission code transmits the new program code to the client program, the client program modifies the new program code to enable the permission code to intercept a call of the new program code on the system function and send the permission check request to activate the client program to send the permission check response according to the permission setting, and after the client program modifies the new program code, the permission code allows adding the new program code to the repackaged application.

21. The user device as claimed in claim 20, wherein the license code provides a name of the repackaged application to the client program, the client program provides the name to the application management system, the application management system provides the license information according to the name, and the client program receives the license information from the application management system.

22. The user device as claimed in claim 20, wherein the client program provides a user interface to facilitate a user of the user device changing the permission setting.

23. The user device as claimed in claim 20, wherein the client program receives permission management information from the application management system, and changes the permission setting according to the permission management information.

24. The user device as claimed in claim 20, wherein when the license code does not receive the license check response within a predetermined time after sending the license check request, the license code terminates the repackaged application, and when the permission code does not receive the permission check response within the predetermined time after sending the permission check request, the permission code does not execute the system function.

25. The user device as claimed in claim 20, wherein the application management system further injects at least one key into the original application through the repackaging process to generate the repackaged application, and the license code or the permission code provides a name of the repackaged application to the client program, the client program provides the name to the application management system, the application management system provides one of the at least one key according to the name, and the client program receives the key from the application management system, wherein when the name is provided by the license code, the license code uses the key to encrypt the license check request and decrypt the license check response, and the client program uses the key to decrypt the license check request and encrypt the license check response, and when the name is provided by the permission code, the permission code uses the key to encrypt the permission check request and decrypt the permission check response, and the client program uses the key to decrypt the permission check request and encrypt the permission check response.

26. The user device as claimed in claim 25, wherein the client program stores the license information and/or the key received from the application management system into the user device, wherein when the user device already stores the license information, the client program sends the license check response according to the license information stored in the user device, and when the user device already stores the key, the client program uses the key stored in the user device to decrypt the license check request and/or the permission check request, and the client program uses the key stored in the user device to encrypt the license check response and/or the permission check response.

* * * * *